R. E. L. MILLER.
INTESTINE PROTECTOR.
APPLICATION FILED DEC. 18, 1911.
1,060,350.
Patented Apr. 29, 1913.
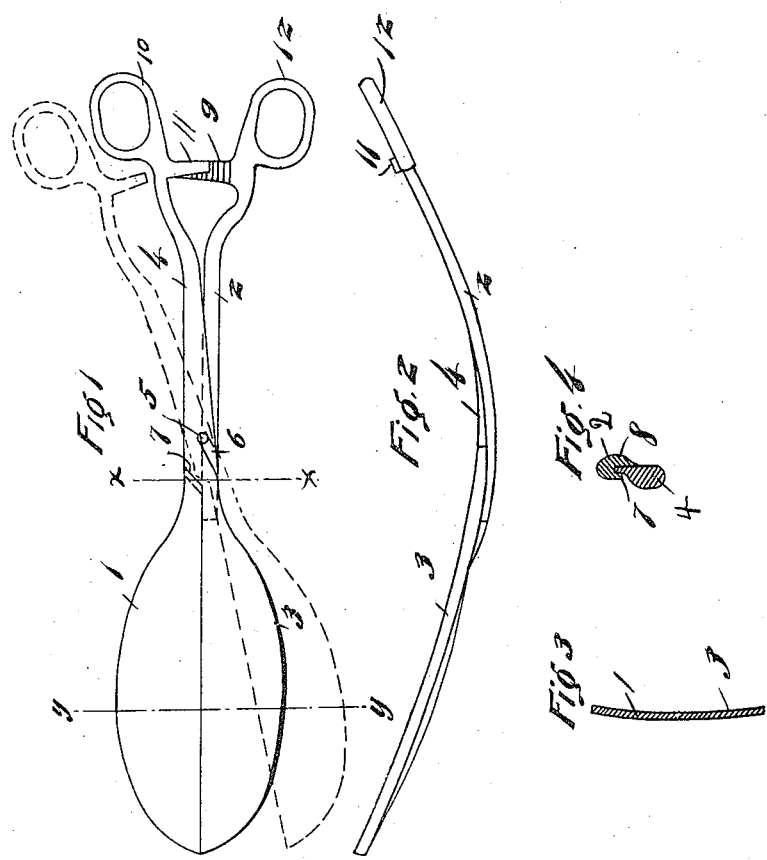
Witnesses
Inventor,
R. E. L. Miller,
By A. L. Jackson
Attorney

UNITED STATES PATENT OFFICE.

ROBERT E. L. MILLER, OF FORT WORTH, TEXAS.

INTESTINE-PROTECTOR.

1,060,350.  Specification of Letters Patent.  Patented Apr. 29, 1913.

Application filed December 18, 1911. Serial No. 666,590.

*To all whom it may concern:*

Be it known that I, ROBERT E. L. MILLER, a citizen of the United States, residing at Fort Worth, in the county of Tarrant and State of Texas, have invented certain new and useful Improvements in Intestine-Protectors, of which the following is a specification.

This invention relates to surgeons' instruments, and more particularly to an instrument for protecting the intestines from the needle or other instrument used in sewing up the wounds of the abdomen after an operation.

Heretofore sponge and other devices have been used to hold the intestines back away from the wound while sewing up the peritoneum so that the intestines will not be injured by the needle or other device. Such means or devices fill up the cavity and prevent inspection and cleansing of the cavity and the sponge is frequently caught by the needle and these devices are otherwise very unsatisfactory and tedious and cause much loss of time and sometimes a sponge is left and sewed up within the cavity. With the improved instrument hereinafter set forth the intestines are held entirely out of the reach of the operating needle and the cavity can be inspected and cleansed and the instrument will save considerable time which is an important element.

Other objects and advantages will be fully explained in the following description and the invention will be more particularly pointed out in the claims.

Reference is had to the accompanying drawings which form a part of this application.

Figure 1 is a plan view of the improved instrument. Fig. 2 is a side elevation of the same. Fig. 3 is a cross-section, taken on the line *y—y* of Fig. 1. Fig. 4 is a cross-section taken on the line *x—x* of Fig. 1.

Similar characters of reference are used to indicate the same parts throughout the several views.

The improved instrument has two members, each having a relatively wide flat blade and a handle. One member has a blade 1 and a shank 2 with a finger loop 12 and the other member has a blade 3 with a shank 4 and finger loop 10. These members are detachably hinged together. The shank 4 has a slot 6 which is adapted to receive a pivot lug or rivet 5 which is rigid in the shank 2. The shank 2 has a lateral groove formed by a lip 7 and the shank 4 has a tongue or shoulder 8 which is received into the groove under lip 7 for locking the two members together. The shank 2 has an arm projecting therefrom with a rack 9 formed thereon and the shank 4 has an arm 11 projecting therefrom provided with a detent to engage the rack 9 to hold the two members in locked engagement. The two members are thus detachably hinged together, and the object in making them detachable is to withdraw one of the members at a time so that the opening will not have to be unnecessarily large for the removal of the instrument from the cavity. The locking rivet 5 and the shoulder 8 and lip 7 are relatively close together so that a slight movement of one member relative to the other will suffice for detaching the members. Blade 3 can be moved to the position shown in dotted outline in Fig. 1 to be detached. The detent on arm 11 will hold the shanks 2 and 4 in different adjustments by reason of the teeth of the rack 9. To detach the members it is necessary first to detach the detent from the rack 9. The two members can then be moved, one relative to the other. Each blade has a straight edge and the straight edges meet together to form a single pressing surface.

The instrument is concave on the side adjacent to the operations so that the needle will not strike the instrument or so that there will be no impediment to the operation of the needle.

Having fully described my invention, what I claim as new and desire to secure by Letters Patent, is—

1. An instrument of the character described comprising two members detachably hinged together and each member having a relatively wide blade and a handle, the two blades when brought into operative position forming a single pressing surface dished in the central portion to form a cavity for the hand of the operator, and means for locking the two members in operative position.

2. An instrument of the character described comprising two members detachably hinged together, and each member consisting of a blade having the meeting edge parallel to a plane perpendicular to the general contour and passing through the longitudinal center of the instrument, and the other edge curved and having a shank and a handle, the two blades when brought into operative relation forming a single pressing surface elliptical in form and dished in the central portion, and means for locking the two members in operative relation.

3. An instrument of the character described comprising two members hingedly connected together, each member having a blade and a shank and a handle, the edges of said blades coming together along a median line and forming a single relatively wide pressing surface on the exterior thereof and forming a cavity on the interior for the hand of the operator, and means for locking said blades firmly in operative position during operation but easily detachable for removal of one blade at a time.

In testimony whereof I set my hand in the presence of two witnesses, this 6th day of December, 1911.

ROBERT E. L. MILLER.

Witnesses:
A. L. JACKSON,
L. T. KNIGHT.

---

Copies of this patent may be obtained for five cents each, by addressing the "Commissioner of Patents, Washington, D. C."